United States Patent [19]

Medgebow et al.

[11] 3,941,295
[45] Mar. 2, 1976

[54] WELDING JIG
[75] Inventors: Irving Medgebow; Gene White, both of Tampa, Fla.
[73] Assignee: Jackson Products Company, Tampa, Fla.
[22] Filed: Nov. 8, 1974
[21] Appl. No.: 522,041

[52] U.S. Cl.............. 228/44.1 R; 228/50; 219/161
[51] Int. Cl.² ........................................ B23K 37/04
[58] Field of Search ............. 228/6, 44, 44.1, 50, 4; 29/494; 219/161

[56] References Cited
UNITED STATES PATENTS

| | | | |
|---|---|---|---|
| 1,546,250 | 7/1925 | Phillips | 228/50 X |
| 2,768,597 | 10/1956 | Smith | 228/6 |
| 3,530,272 | 9/1970 | Roper | 228/44 X |
| 3,556,508 | 1/1971 | Varga | 228/44 X |
| 3,640,116 | 2/1972 | Hellman | 228/50 X |

OTHER PUBLICATIONS
"The Welding Engineer" Sept., 1940, p. 28.
Campbell et al., "Welding Apparatus for Fabricating Cabinets," Western Electric Technical Digest, No. 9, Jan., 1968, p. 21.

*Primary Examiner*—Ronald J. Shore
*Attorney, Agent, or Firm*—Meyer, Tilberry & Body

[57] ABSTRACT

A welding jig is provided for supporting C-shaped and L-shaped sheet metal blanks during welding thereof to form a dishwasher housing. The welding jig includes a frame against which the panels of the blanks are disposed with adjacent edges in positions to be welded, and the blank panels are held against the frame by corresponding wall plates during the welding operation. Certain members of the frame are disposed along the lines of juncture between the blanks and are provided with passageways for delivering inert gas to the line of juncture between the blanks during the welding operation. One of the frame members is displaceable relative to a fixed wall of the jig to facilitate the introduction and removal of the blanks, and the remaining walls of the jig are movable relative to the frame for the latter purpose.

15 Claims, 7 Drawing Figures

WELDING JIG

This invention relates to the art of support structures and, more particularly, to a jig for supporting angularly related sheet metal workpieces having adjacent edges to be welded together.

The present invention finds particular utility in connection with the construction of a box-like dishwasher housing from a plurality of stainless steel sheet metal blanks. Accordingly, the invention will be described in detail with regard to such a construction. At the same time, it will be appreciated that the invention is readily applicable to the construction of other articles.

In the welding of angularly related metal sheets in the presence of a protective gaseous atmosphere, it is necessary to support the wall panels during the welding operation and to deliver an inert gas such as argon to the weld area during the welding operation. In accordance with the present invention, metal blanks to be welded are supported by a jig which includes frame members structured to deliver protective gas between adjacent edges of the metal blanks from the side thereof opposite the side on which welding takes place. This construction avoids the necessity of having to use a specialized welding gun including means to deliver protective gas from a separate source through the gun and toward the weld area. Moreover, the structure assures the presence of inert gas across the seam to be welded and which seam, transverse to the wall panels, is of course quite thin due to the sheet metal character of the panels.

In accordance with another aspect of the present invention, a welding jig is provided which is comprised of frame and wall components structurally cooperable to facilitate the insertion of the metal blanks in position relative to the frame and to clamp the blanks in position for welding. Once the blanks are clamped in place it is only necessary to open an inert gas supply valve or valves to achieve flow of inert gas between adjacent edges of the blanks and then weld the adjacent edges together. Likewise, upon completion of the welding operation the component parts of the jig are readily operable to release the welded blanks for removal from the jig. Therefore, the overall time required to assemble the blanks on the jig, weld the blanks and remove the welded blanks is minimized.

In accordance with another aspect of the present invention, the welding jig is particularly suited to constructing a box-like sheet metal housing from a pair of blanks, one of which is C-shaped and the other of which is L-shaped. Therefore, only two blank components have to be positioned on the jig, and the number of seams to be welded is minimized. Further in accordance with this aspect of the invention, the frame and walls of the jig cooperatively clamp panels of the blank therebetween, and one of the frame members which delivers inert gas to a seam to be welded is displaceable relative to a fixed wall of the jig to facilitate positioning the C-shaped blank on the jig with the intermediate panel thereof adjacent the fixed wall. When the displaceable frame member is moved to its operable position, the intermediate panel of the blank is held cooperatively between the fixed wall and frame member, and the inert gas passageway in the frame member is properly positioned relative to the seam to be welded. Following the welding operation, the frame member is displaced away from the fixed wall to facilitate removal of the welded article from the jig.

It is accordingly an outstanding object of the present invention to provide a welding jig for supporting angularly related sheet metal workpieces having adjacent edges to be welded in a protective gas atmosphere.

Another object is the provision of a welding jig of the foregoing character in which components of the jig serve as support members for the workpieces and also to deliver inert gas between adjacent edges of the workpieces from the side thereof opposite the sides to be welded.

Yet another object is the provision of a jig of the foregoing character comprised of frame members and wall members cooperable to releaseably receive and hold the workpieces in positions for welding and in which certain of the frame members provide supply passages for delivering inert gas to the weld area.

Yet another object is the provision of a welding jig for supporting C-shaped and L-shaped sheet metal blanks having adjacent edges to be welded together for the blanks to form a box-like structure.

Still a further object is provision of a welding jig of simple construction and operation, which is economical to produce and use and which minimizes set-up time and welding time in the construction of a box-like housing.

The foregoing objects, and others, will in part be obvious and in part pointed out more fully hereinafter in conjunction with the written description of the accompanying drawings illustrating a preferred embodiment of the invention and in which:

Figure 1:
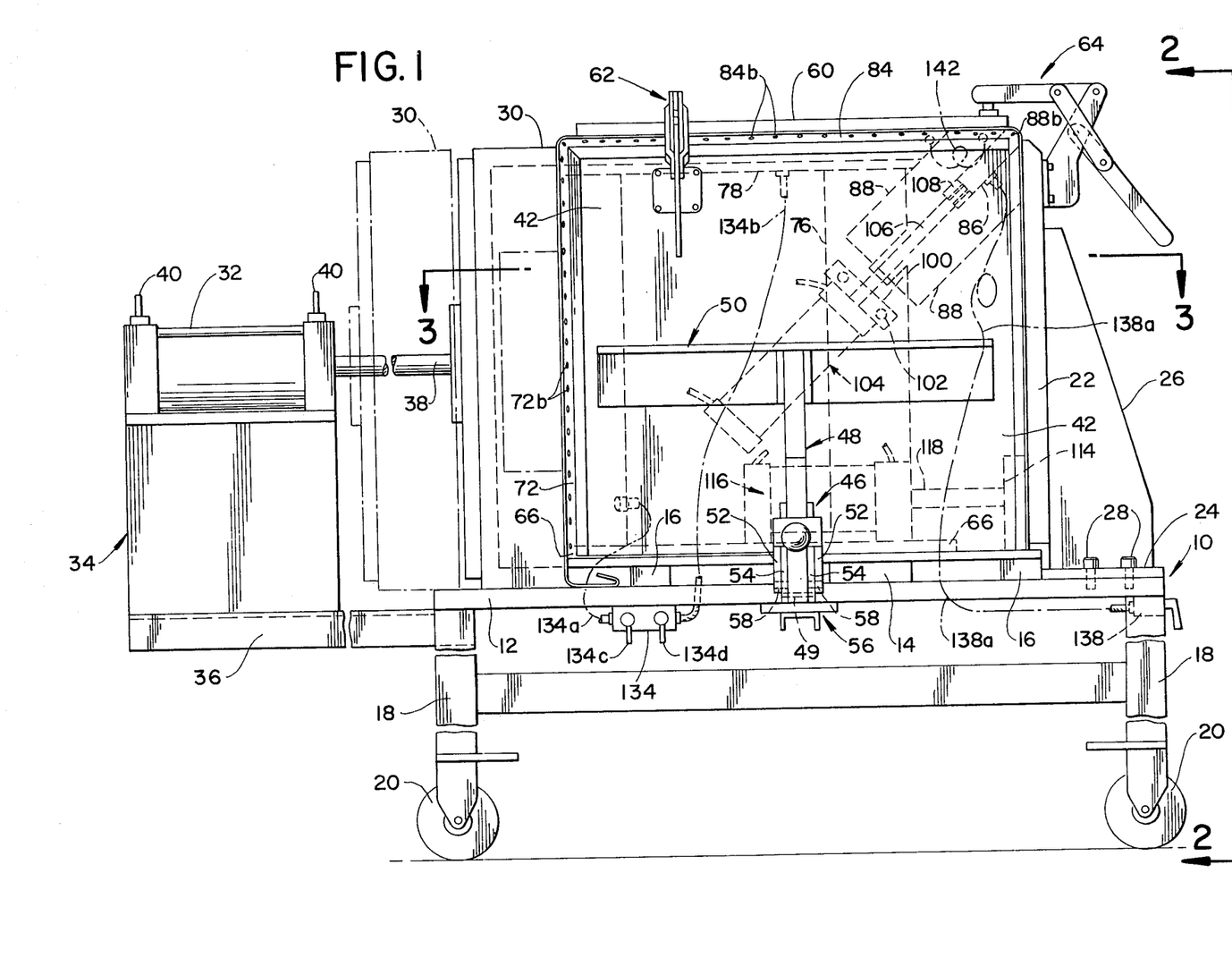
FIG. 1 is a side elevation view of a welding jig made in accordance with the present invention.
Figure 2:
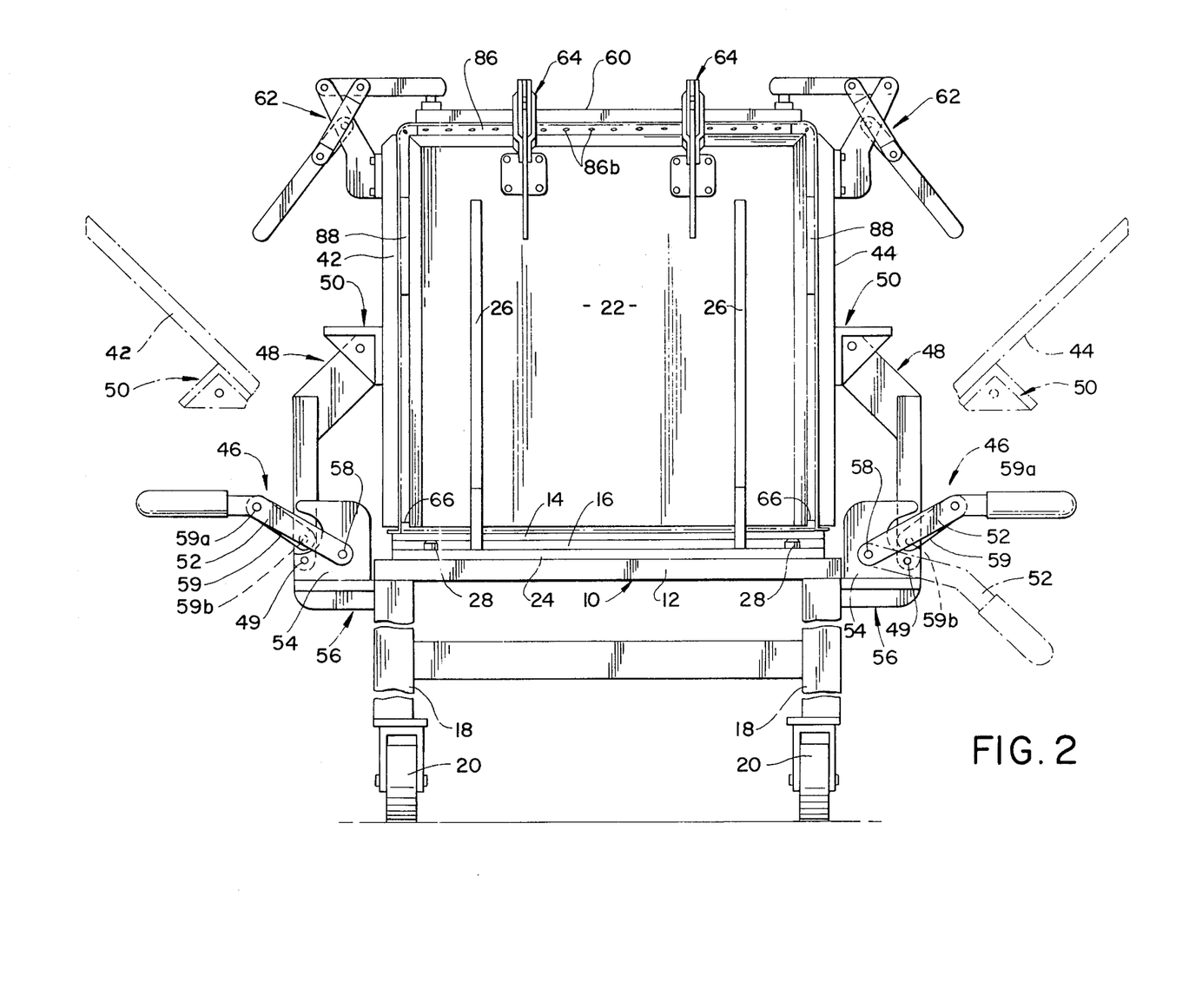
FIG. 2 is an end elevation view of the jig as seen along line 2—2 in FIG. 1.
Figure 3:
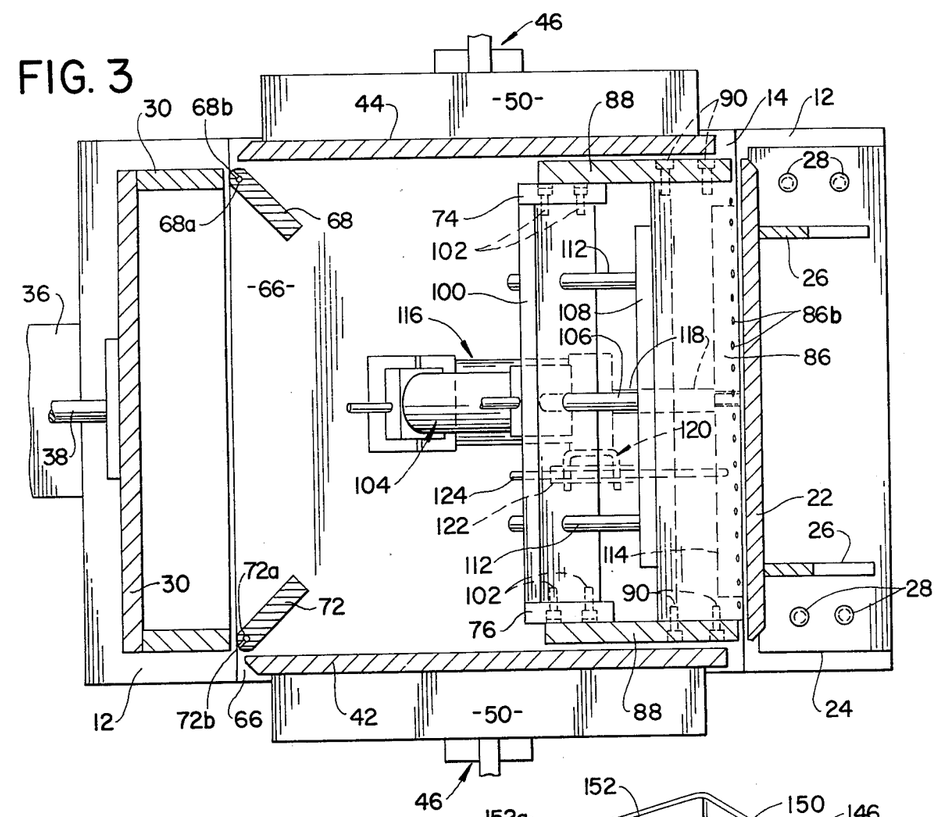
FIG. 3 is a plan view in section of the jig, the view being along line 3—3 in FIG. 1.

Referring now in greater detail to the drawings wherein the showings are for the purpose of illustrating a preferred embodiment of the invention only and not for the purpose of limiting the same, the welding jig shown in FIGS. 1–3 includes a rectangular base portion 10 including a base plate 12 and a frame support plate 14 spaced thereabove by means of a plurality of spacer blocks 16. Plates 12 and 14 and spacer block 16 are suitably interconnected, such as by bolts, not illustrated, so that frame supporting plate 14 is removable from base plate 12. Preferably, the welding jig is portable to facilitate movement thereof between locations in a shop or the like and, for this purpose, base plate 12 is provided with a plurality of legs 18 having wheels or casters 20 thereon.

The jig further includes a fixed end wall 22 mounted on one end of base plate 12 by means of a mounting plate 24 and gusset plates 26 to which wall panel 22 is welded. Preferably, mounting plate 24 is removably interconnected with base plate 12 such as by bolts 28. The jig further includes an end wall member 30 at the opposite end of base plate 12. Wall member 30 is slidable relative to the upper surface of base plate 12 and toward and away from fixed wall 22, and a pneumatic motor 32 is provided to achieve selected displacement of wall member 30 in opposite directions. Motor 32 is mounted on a support bracket assembly 34 which is supported relative to base plate 12 by means of a support arm 36 welded to the underside of base plate 12. Motor 32 includes a reciprocable piston rod 38 having its outer end suitably attached to wall member 30 and, in a well known manner, motor 32 is provided with inlet and outlet lines 40 connectable to a source of air under pressure to achieve displacement of piston rod 38 and thus wall member 30 in opposite directions. It will be appreciated that suitable controls, not shown, are employed to control the flow of air to motor 32 to achieve reciprocation of piston rod 38.

The jig further includes a pair of sidewalls 42 and 44 mounted on the base portion for pivotal movement between the solid line and broken line positions illustrated in FIG. 2. More particularly, each sidewall is mounted on the base portion by means of a corresponding wall pivoting and clamping assembly 46 operable to support the wall for pivotal movement between the two positions thereof and to releasably clamp the wall in the solid line position shown. Any suitable pivoting and clamping mechanism can be employed and, in the embodiment shown, assemblies 46 are identical and include an arm 48 attached at one end to a corresponding bracket 50 mounted on the sidewall, and an arm operating handle portion including levers 52 pivotally interconnected with a pair of mounting bracket walls 54 welded on a base assembly 56 which is welded to the underside of base plate 12. Each arm 48 is pivotally connected to bracket walls 54 by a pin 49 and handle levers 52 are pivotally connected to bracket walls 54 by means of a pin 58. A link 59 has its opposite ends pivotally interconnected with levers 52 and arm 48 by means of pins 59a and 59b, respectively. It will be appreciated, therefore, that the handles are displaceable downwardly as seen in FIG. 2 to achieve pivotal movement of the corresponding sidewall from the solid line to the broken line positions thereof. Further, arms 48, levers 52 and link 59 of each assembly 46 are structurally operable when pivoted upwardly to provide a toggle type clamping action for releaseably holding sidewalls 42 and 44 in the upright positions thereof.

The jig further includes a top wall member 60 completely separate from end walls 22 and 30 and sidewalls 42 and 44 and which, as set forth more fully hereinafter, is supported between the latter walls at the upper edges thereof. Top wall 60 is adapted to be clamped in place with respect to the sidewalls and end walls and, for this purpose, sidewalls 42 and 44 are provided with releaseable clamp assemblies 62 and end wall 22 is provided with releaseable clamp assemblies 64. Clamp assemblies 62 and 64 can be identical, and any suitable clamp structure can be employed.

Figure 4:
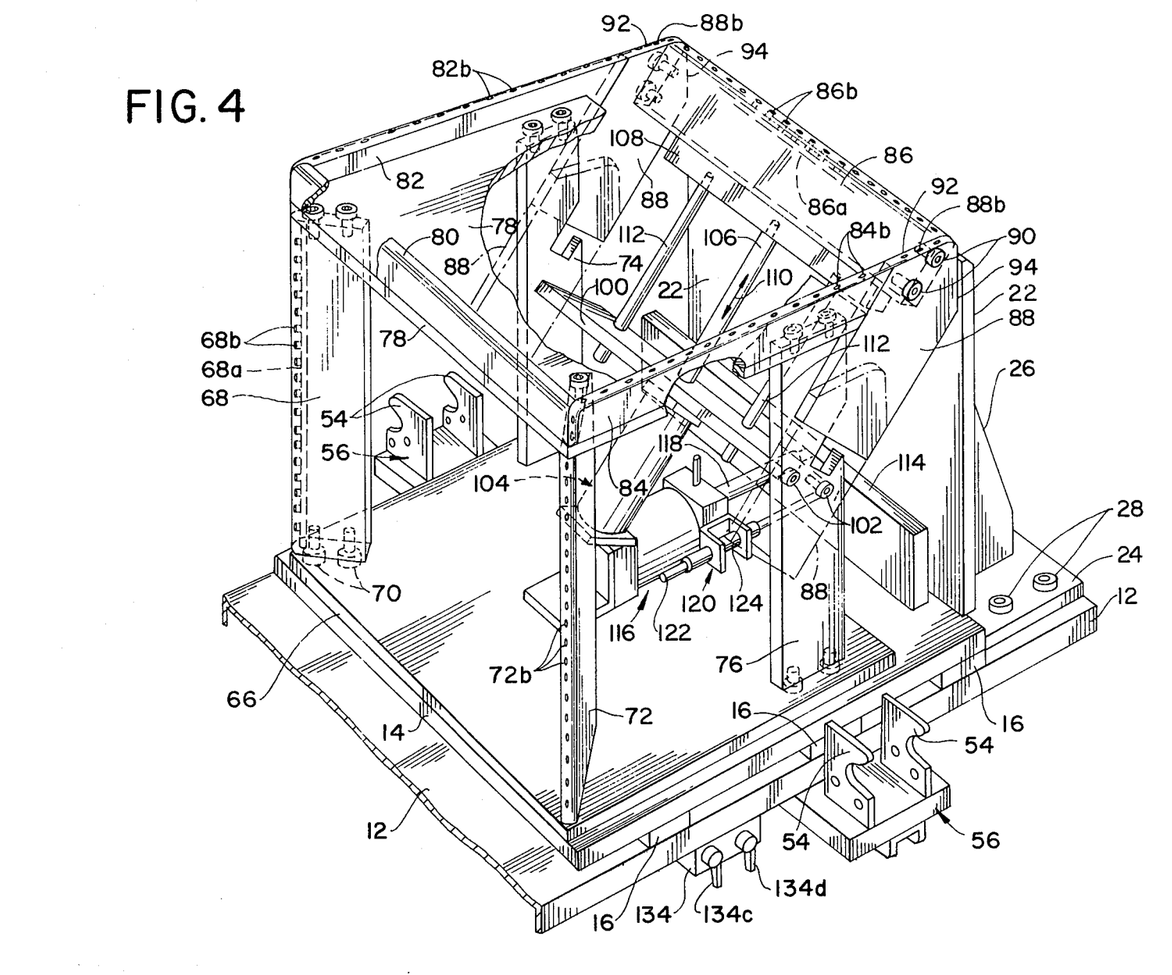
FIG. 4 is a perspective view of the frame portion of the jig shown in FIGS. 1–3.

As best seen in FIGS. 3 and 4, the jig further includes a frame assembly within end walls 22 and 30 and sidewalls 42 and 44. The frame assembly includes a frame mounting plate 66 overlying frame support plate 14. An upright frame member 68 is mounted on plates 14 and 66 by means of bolts 70 at the corner of the plates corresponding to the corner between sidewall 44 and end wall 30. A similar upright frame member 72 is mounted on plates 14 and 66 at the corner thereof corresponding to the corner between sidewall 42 and end wall 30. Further, a pair of upright support members 74 and 76 are mounted on plates 14 and 66 by corresponding bolts at locations adjacent the sides of the plates and between upright members 68 and 72 and fixed end wall 22. The upper ends of upright frame members 68 and 72 and support members 74 and 76 are interconnected by a horizontal plate 78 which is bolted to the upper ends of the latter members.

The frame assembly further includes a cross member 80 on plate 78 and extending between upright members 68 and 72, an upper side frame member 82 on plate 78 and extending from upright member 68 toward fixed end wall 22, and an upper side frame member 84 on plate 78 and extending from upright member 72 toward fixed end wall 22. Members 80, 82 and 84 are suitably secured to plate 78 and accordingly are fixed relative to the base portion.

The frame assembly further includes an end frame member 86 which, as described more fully hereinafter, is movable relative to the remainder of the frame assembly. Member 86 has opposite ends each provided with a filler frame component 88 mounted thereon such as by bolts 90 for movement therewith. The ends of side plate members 82 and 84 are tapered at an angle of about 45° and terminate in spaced relationship with respect to fixed wall 22. Filler plate members 88 have an upper edge 92 adapted to fill the latter space, and an end edge 94 extending parallel to fixed end wall 22 when the filler plates are in the positions illustrated in FIG. 4.

A support plate 100 extends between support members 74 and 76 and is secured thereto such as by bolts 102. A pneumatic piston cylinder type motor 104 is mounted on support plate 100 and includes a piston rod 106 having an outer end secured to a bar 108 suitably attached to end frame member 86. Mounting plate 100 is on an angle of about 45° and it will be appreciated, therefore, that reciprocation of rod 106 moves end frame member 86 and thus filler plates 88 in the direction of arrow 110 and between the solid line and broken line positions illustrated in FIG. 4. A pair of guide rods 112 have ends interconnected with bar 108 and opposite ends extending through corresponding openings in plate 100. Rods 112 and the openings in plate 100 prevent rotation of piston rod 106 and thus end frame member 86 relative to the piston rod axis.

For the purpose set forth hereinafter, a clamping bar 114 extends across the frame parallel to fixed wall 22 and adjacent the lower edge thereof. Clamping bar 114 is supported for movement toward and away from wall 22 by means of a pneumatic motor 116 having a reciprocable piston rod 118 fastened to bar 114. It will be appreciated that motors 104 and 116 have air inlet and outlet lines connectable to a source of air under pressure and through suitable controls to achieve reciprocation of the corresponding piston rods and the components attached thereto. Rotation of clamping bar 114 relative to the axis of piston rod 118 is restrained by means of a guide rod assembly 120 including a guide rod 122 extending through a guide sleeve 124 and having an end suitably attached to clamp bar 114.

Figure 5:
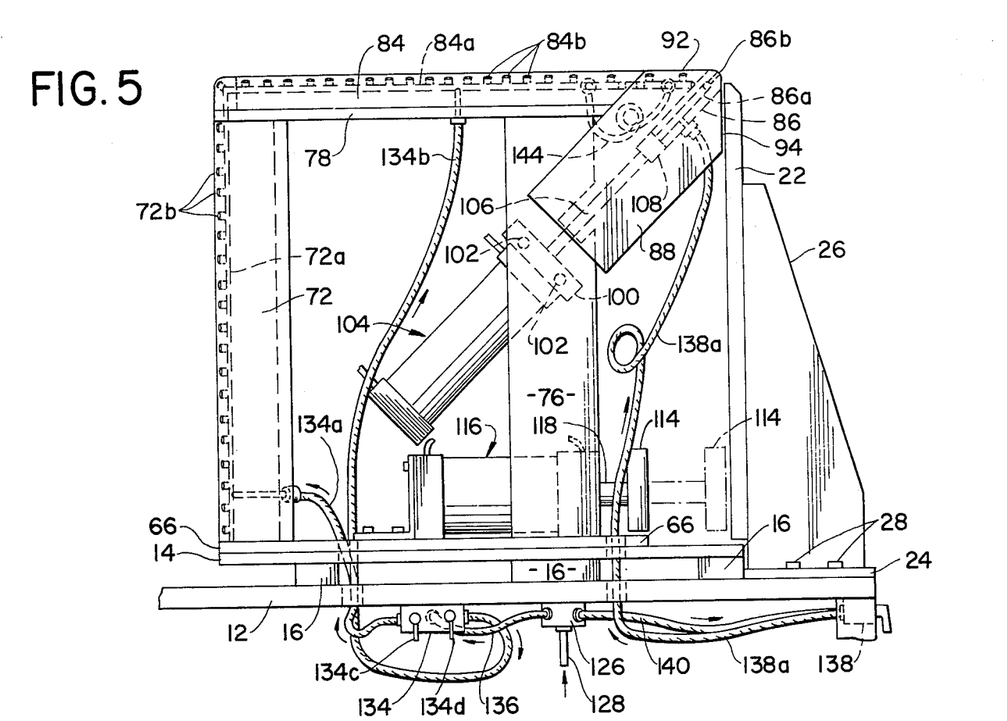
FIG. 5 is a side elevation view of the frame portion showing details of the inert gas supply to the frame members.
Figure 6:
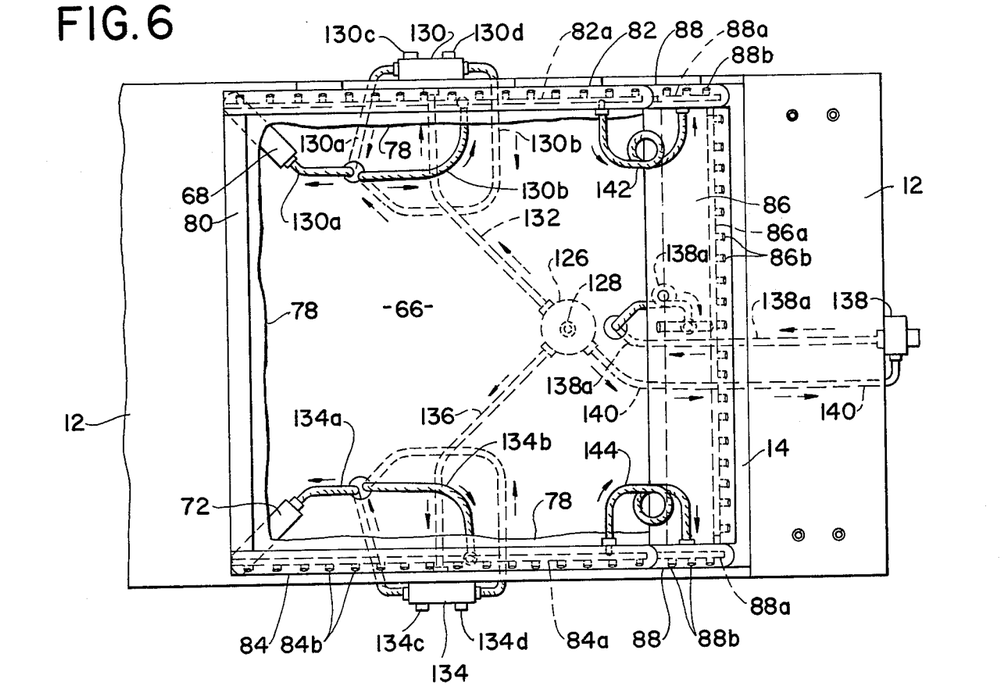
FIG. 6 is a plan view of the frame assembly illustrated in FIG. 5.

As best seen in FIGS. 4, 5 and 6, upright frame member 68 is provided with a longitudinal gas passageway 68a, the opposite ends of which are plugged, and a plurality of apertures 68b opening from passageway 68a toward the corresponding corner of the frame assembly. Similarly, upright frame members 72 are provided with a longitudinal gas passageway 72a, the opposite ends of which are plugged, and a plurality of apertures 72b opening from passageway 72a toward the corresponding corner of the frame assembly. Upper side frame member 82 is provided with a longitudinal gas passageway 82a and a plurality of outlet apertures 82b opening toward the corresponding side edge of the frame assembly, and upper side frame member 84 includes a longitudinal passageway 84a and a plurality of outlet apertures 84b opening therefrom toward the corresponding side edge of the frame assembly. Further, passageways 82a and 84a in upper side members 82 and 84 include portions at the ends thereof which overlie members 68 and 72. The latter portions extend vertically from the corresponding passageways 82a and 84a, as shown for member 82 in FIG. 5 of the drawing. Filler frame members 88 are each provided with a gas passageway 88a longitudinally aligned with passageways 82a and 84a in members 82 and 84. Members 88 further include outlet apertures 88b opening from passageways 88a toward the corresponding side edge of the frame assembly. Finally, end frame member 86 is provided with a longitudinal gas passageway 86a and a plurality of outlet apertures 86b extending therefrom toward the corresponding end edge of the frame assembly.

The gas passageways thus defined are adapted to receive an inert gas and to direct the inert gas between the adjacent edges of workpieces supported between the frame assembly and wall members of the jig as set forth more fully hereinafter. In the embodiment shown, inert gas is supplied to the several frame members from a manifold component 126 suitably mounted beneath base plate 12 and having an inlet 128 connectable to a suitable source of inert gas, not shown. Manifold 126 is connected to a valve assembly 130 by means of a line 132, a valve assembly 134 by means of a line 136, and to a valve 138 by means of a line 140. Valve assembly 130 is connected by means of line 130a to passageway 68a in member 68 and by means of line 130b to passageway 82a in member 84. Valves 130c and 130d of valve assembly 130 respectively control the flow of gas to lines 130a and 130b. Similarly, valve assembly 134 is connected to passageway 72a of member 72 by means of line 134a and to passageway 84a of member 84 by means of line 134b. Valve elements 134c and 134d respectively control the flow of gas through lines 134a and 134b. Valve 138 controls the flow of gas to passageway 86a of member 86 through line 138a. Further, gas passageways 82a in member 82 and 88a in the corresponding filler member 88 are interconnected for flow communication by a line 142, and gas passageway 84a in member 84 and gas passageway 88a in the corresponding filler member 88 are interconnected for flow communication by means of a line 144. Lines 142 and 144 are of a length to accommodate the movement of filler members 88 with member 86 relative to side members 82 and 84.

Figure 7:
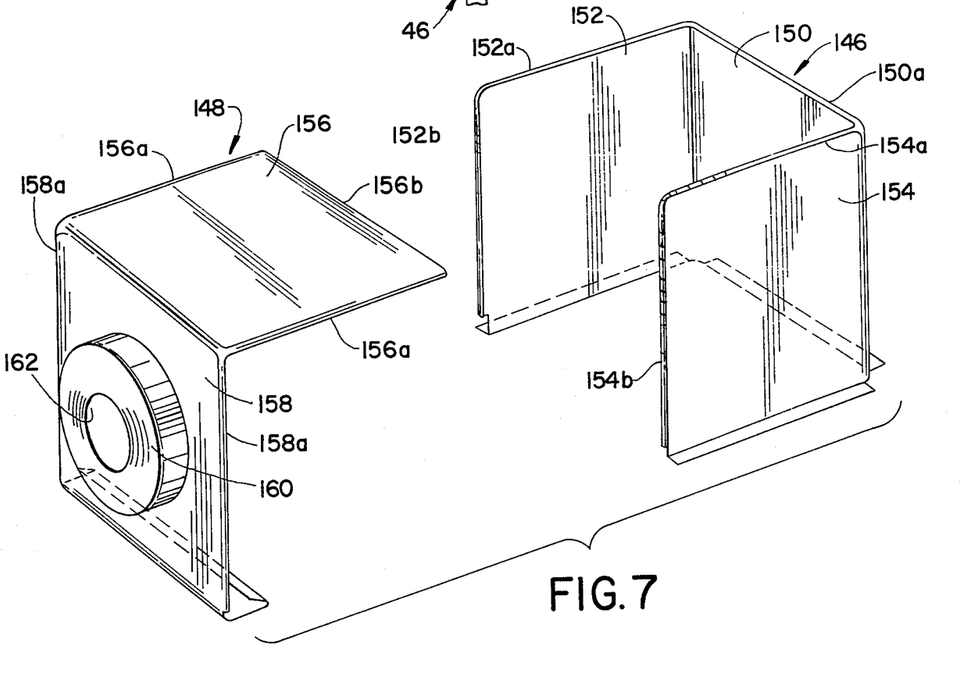
FIG. 7 is a perspective view of sheet metal blanks for use with the jig in constructing a dishwasher housing.

Use of the welding jig thus described will be best understood by referring first to FIG. 7 wherein sheet metal workpieces for use in accordance with the preferred embodiment are shown. The sheet metal workpieces shown in FIG. 7 include a U-shaped stainless steel workpiece 146 and an L-shaped stainless steel workpiece 148. Workpiece 146 includes a center or intermediate panel 150 and side panels 152 and 154 extending at right angles thereto. Panels 150, 152 and 154 have corresponding upper edges 150a, 152a and 154a. Further, panels 152 and 154 have corresponding front edges 152b and 154b, and panels 150, 152 and 154 have corresponding out turned flanges at the lower edges thereof. Workpiece 148 is comprised of panels 156 and 158 at right angles to one another. Panel 156 includes side edges 156a and end edge 156b, and panel 158 includes side edges 158a and a flange at the bottom edge thereof extending rearwardly beneath panel 156. Further, panel 158 is provided with dished central portion 160 apertured at 162.

Workpieces 146 and 148 are adapted to be welded together to define a box-like dishwasher housing. More particularly, panel 156 of workpeice 148 is adapted to be disposed with edges 156a adjacent edges 152a and 154a of workpiece 146 and with edge 156b adjacent edge 150a of workpiece 146. When so positioned, edges 158a of workpiece 148 extend adjacent edges 152b and 154b of workpiece 146. When the adjacent edges are welded together a box-like structure is defined in which the flanges on the workpiece define an open side corresponding to the front of the dishwater housing, dished portion 160 defines a sump in the bottom wall of the housing and opening 162 defines a drain opening through the bottom wall.

In use of the welding jig with the workpieces shown in FIG. 7, motor 32 is actuated to displace end wall 30 away from fixed wall 22, and wall pivoting and clamping assemblies 46 are manipulated to pivot sidewalls 42 and 44 outwardly relative to the frame assembly to the broken line positions thereof illustrated in FIG. 2 of the drawing. Further, motor 104 is actuated to displace end frame member 86 and filler members 88 downwardly and inwardly from end wall 22, and motor 116 is actuated to displace clamping bar 114 away from end wall 22. U-shaped workpiece 146 is then positioned around the frame assembly with the flanges at the lower edges of panels 152 and 154 engaging frame support plate 14 adjacent the side edges of frame plate 66. More particularly, panel 150 is disposed adjacent fixed end wall 22, panel 152 is disposed adjacent upright member 68 and side member 82, and panel 154 is disposed adjacent upright member 72 and side member 84. Motor 104 is then actuated to displace end frame member 86 and filler members 88 to the positions thereof illustrated in FIG. 4, and motor 116 is actuated to displace clamping bar 114 toward fixed end wall 22 to clamp the lower portion of panel 150 against the latter wall. Sidewalls 42 and 44 are then displaced to the solid line positions thereof illustrated in FIG. 2, whereby panels 152 and 154 of workpiece 146 are clamped in place relative to the corresponding side of the frame assembly.

L-shaped workpiece 148 is then positioned on the frame assembly with panel 156 overlying side frame members 82 and 84 and end frame member 80, and with panel 158 overlying upright members 68 and 72 with the flange at the lower edge thereof extending beneath frame support plate 14. Motor 32 is then actuated to displace end wall 30 into engagement with panel 158 for the latter to be clamped against the frame assembly. Top wall 60 is then placed on top of the frame assembly to overlie panel 156 of workpiece 148, and clamp assemblies 62 and 64 are manipulated to clamp the top wall in place. It will be noted at this point that adjacent edges of the walls of the jig along the seams to be welded are slightly spaced apart. Moreover, the gas outlet passageways in the frame members are disposed in the spaces between the wall edges and are aligned with the line of juncture between the adjacent edges of the sheet metal panels to be welded. In the embodiment shown, the edges of the box-like dishwasher housing are rounded, whereby the adjacent edges of the workpiece panels are each partially rounded as are the contours of the outer edges of the members of the frame assembly along the edges between the workpiece panels.

The sheet metal workpieces are now securely clamped in place, whereby a workman can proceed to weld the adjacent panel edges. In this respect, the workman can selectively actuate the flow control valves described hereinabove to weld a seam between selected ones of the adjacent edges of the blanks, thus to save gas. It will be appreciated, however, that all of the valves can be opened so that gas is supplied to all of the frame members simultaneously so that welding can proceed continuously without interruption. During the welding operation the inert gas, such as argon, flows between the adjacent edges of the blank panels from the insides thereof toward the outsides, and welding is achieved from outside the jig. When the welding operation is completed, clamping devices 62 and 64 are released and top wall 60 is removed, motor 32 is actuated to displace end wall 30 away from the frame assembly, sidewalls 42 and 44 are released and pivoted outwardly relative to the frame assembly, and motors 104 and 116 are actuated to displace the components controlled thereby away from fixed wall 22. The completed dishwasher housing is then lifted upwardly from the frame assembly, and the jig is now ready for a subsequent operation.

While considerable emphasis has been placed herein on the specific structure of certain components of the welding jig and on the structural interrelationship between components of the preferred embodiment, it will be appreciated that many changes can be made in the embodiments shown without departing from the principles of the present invention. Moreover, it will be appreciated that the frame components and wall members can readily be employed to releaseably support a pair of sheet metal workpieces in an angular relationship to define a corner therebetween to be welded in an inert gas atmosphere without necessarily constructing a box-like article. Likewise, it will be appreciated that the wall members of the jig can be supported for displacement relative to the frame assembly other than by the pivotal and reciprocating support assemblies shown and that the fixed end wall could readily be mounted for displacement relative to the frame assembly in a manner similar to that of the opposite end wall or the sidewalls. It will be further appreciated that in a structure in which the fixed end wall is replaced by a removable end wall, the end frame member and filler frame components described herein as being movable could be fixed relative to the remaining components of the frame assembly. As many embodiments of the present invention can be made and as many changes can be made in the embodiment herein illustrated and described, it is to be distinctly understood that the foregoing descriptive matter is to be interpreted merely as illustrative of the present invention and not as a limitation.

What is claimed is:

1. A jig for welding sheet metal workpieces to define a box-like structure having opposed pairs of wall panels and an end panel and lines of juncture therebetween comprising, base means, frame means on said base means and including frame members extending in the direction of said lines of juncture, wall means cooperable with said frame means to receive and releaseably support said work pieces therebetween, said frame members having gas passageway means therein connectable to a source of inert gas and including outlet means for delivering inert gas in the direction of said lines of juncture, said wall means including a fixed wall on said base means having an edge corresponding to one of said lines of juncture and said frame members including a first frame member generally parallel to said edge and movable relative to said fixed wall, means supporting said first frame member on said base means for reciprocating movement between first and second positions along a path toward and away from said wall edge, and means to selectively reciprocate said first frame member between said positions, said first frame member being adjacent said fixed wall when said first frame member is in said first position.

2. The jig according to claim 1, wherein said frame members further include second and third frame members on said base means and extending generally perpendicular to said fixed wall, said second and third frame members each having first ends spaced from said fixed wall, and said frame members further including filler frame portions movable with said first frame member and occupying the space between said first ends and said fixed wall when said first frame member is in said first position.

3. The jig according to claim 2, wherein said wall means further includes a pair of wall members mounted on said base means for movement relative thereto between first and second positions relative to a corresponding one of said second and third frame members, said wall members in said first positions each being cooperable with said corresponding frame member to support a workpiece panel therebetween, and means releaseably holding said wall members in said first positions.

4. The jig according to claim 3, wherein said second and third frame members have second ends spaced from said first ends in the direction away from said fixed wall, said frame members further including fourth and fifth frame members fixed on said base means and each extending between said base means and the second end of a corresponding one of said second and third frame members, and said wall means including a further wall member mounted on said base means for movement between first and second positions relative to said fourth and fifth frame members, said further wall member in said first position being cooperable with said fourth and fifth frame members to support a workpiece panel therebetween, and means to selectively move said further wall member between said positions thereof.

5. A jig for welding C-shaped and L-shaped sheet metal blanks together to define a box-like structure comprising, base means having opposite ends and opposite sides, frame means on said base means, said frame means including upright frame members adjacent said sides at one of said ends and side frame members spaced above said base means and parallel to a corresponding one of said opposite sides, said frame means further including an end frame member at the other of said ends of said base means, and wall means on said base means, said wall means including end wall members at each of said opposite ends of said base means and sidewall members at each of said opposite sides of said base means, each of said side wall members and at least one of said end wall members being supported on said base means for movement between first and second positions relative to said frame means, said side and one end wall members in said first positions being cooperable with said frame means to support said blanks with adjacent edges thereof defining lines of juncture therebetween for welding, said side and one end wall members in said second positions thereof being displaced from said frame means for said blanks to be received and removed from said frame means, said upright, side and end frame members including gas passageway means connectable to a source of inert gas and having outlet means for directing inert gas between said adjacent edges of said blanks along the lines of juncture therebetween.

6. The jig according to claim 5, wherein said end frame member is supported on said base means for movement between first and second positions relative thereto and the end wall member at the corresponding end of said base means is fixed on said base means, said fixed end wall member having an upper edge, and said end frame member in said first position thereof being adjacent said upper edge and cooperable with said fixed end wall member to support the portion of said blanks disposed therebetween, said end frame member in said second position thereof being spaced from said upper edge to release said portion of said blanks.

7. The jig according to claim 6, wherein said side wall members are pivotally mounted on said base means, and means releaseably holding said sidewall members in said first positions against pivotal movement.

8. The jig according to claim 7, wherein said at least one of said end wall members is reciprocally supported on said base means for movement toward and away from said fixed end wall member and means to selectively move said one end wall member between said first and second positions thereof.

9. The jig according to claim 8, wherein said wall means further includes a top wall member removably supported on said frame means, and means for releaseably interengaging said top wall member with said sidewall members and said fixed end wall member when the latter members are in said first positions thereof.

10. The jig according to claim 6, wherein said side frame members each have an end facing and spaced from said fixed end wall member, said frame means further including second side frame members carried by said end frame member for movement therewith, each said second side frame members in said first position of said end frame member occupying the space between a corresponding one of said side frame members and said fixed end wall member.

11. The jig according to claim 10, wherein said end frame member is supported for movement along a path downwardly and away from said upper edge, and means to selectively move said end frame member between said first and second positions thereof.

12. The jig according to claim 11, and clamping means on said base means displaceable toward and away from said fixed end wall member at a location spaced below said upper edge to releaseably clamp said portion of said blanks against said fixed end wall member at said location, and means to selectively displace said clamping means toward and away from said fixed end wall member.

13. The jig according to claim 12, wherein said sidewall members are pivotally mounted on said base means, and means releaseably holding said sidewall members in said first positions against pivotal movement.

14. The jig according to claim 13, wherein said at least one of said end wall members is reciprocally supported on said base means for movement toward and away from said fixed end wall member, and means to selectively move said one end wall member between said first and second positions thereof.

15. The jig according to claim 14, wherein said wall means further includes a top wall member removably supported on said frame means, and means releaseably interengaging said top wall member with said sidewall members and said fixed end wall member when the latter members are in said first positions thereof.

* * * * *